(12) United States Patent
Boyle et al.

(10) Patent No.: US 8,438,106 B2
(45) Date of Patent: May 7, 2013

(54) MEDICAL SAVINGS ACCOUNTS WITH INVESTMENT AND LOAN-ACCOUNT ACCESS

(75) Inventors: Margaret A. Boyle, Wauwatosa, WI (US); Steven T. Brown, Franklin, WI (US); Rosanne Marie Butkowski, New Berlin, WI (US); Beth Griffin, Waukesha, WI (US)

(73) Assignee: Alegeus Technologies LLC, Waltham, MA (US)

( * ) Notice: Subject to any disclaimer, the term of this patent is extended or adjusted under 35 U.S.C. 154(b) by 1109 days.

(21) Appl. No.: 11/627,138

(22) Filed: Jan. 25, 2007

(65) Prior Publication Data

US 2008/0183606 A1    Jul. 31, 2008

(51) Int. Cl.
*G06Q 40/00* (2006.01)
(52) U.S. Cl.
USPC ............ 705/39; 705/35; 705/36 T; 705/36 R; 705/37; 705/38; 705/40; 707/104.1
(58) Field of Classification Search .............. 705/35–38, 705/30, 39, 40; 707/104.1
See application file for complete search history.

(56) References Cited

U.S. PATENT DOCUMENTS

| | | | |
|---|---|---|---|
| 6,049,782 A * | 4/2000 | Gottesman et al. | 705/36 R |
| 2002/0035529 A1* | 3/2002 | Tooke, III | 705/35 |
| 2002/0174042 A1 | 11/2002 | Arena et al. | |
| 2005/0149436 A1* | 7/2005 | Elterich | 705/39 |
| 2005/0203833 A1 | 9/2005 | Pembroke | |
| 2007/0214005 A1* | 9/2007 | Kennedy | 705/2 |

OTHER PUBLICATIONS

How Debit Cards Can Burn Holes in Student Pockets; Nancy Lloyd; New York Times; New York, N.Y., Sep. 3, 2000.*

* cited by examiner

*Primary Examiner* — Harish T. Dass

(57) ABSTRACT

Methods and systems are disclosed for managing a medical savings account that invests funds in investment accounts. A request is received for payment of a healthcare expense incurred by a party authorized for recovery under the medical savings account. A balance is drawn against a line of credit secured by one or more of the investment accounts. At least a portion of the healthcare expense is paid with funds obtained from the drawn balance. At least a portion of some of the investment accounts are liquidated in accordance with instructions provided by the party or by an owner of the medical savings account to satisfy the drawn balance of the line of credit.

23 Claims, 6 Drawing Sheets

MEDICAL SAVINGS ACCOUNTS WITH INVESTMENT AND LOAN-ACCOUNT ACCESS

BACKGROUND OF THE INVENTION

This application relates generally to medical savings accounts. More specifically, this application relates to mechanisms for funding medical savings accounts.

There are currently a variety of different types of medical spending accounts. These different accounts are managed in different ways and are generally used for different purposes, but have as a common factor that they permit funds to be applied with certain income-tax advantages to pay for certain healthcare expenses. As used herein, "healthcare" expenses include a broad array of expenses that may arise in the course of diagnosing, preventing, curing, or treating any disease that affects any part or function of the human body. They may include expenses related to teeth or other oral structures in the form of dental expenses, and may include expenses related to the eye and other ophthalmic structures in the form of vision expenses. Healthcare expenses may include service fees paid to physicians, dentists, optometrists, nurses, or other medical practitioners, service fees paid to laboratories that perform analyses of blood or other tissues, or that operate diagnostic equipment like x-ray machines, magnetic-resonance-imaging machines, and the like. Healthcare expenses may also include costs incurred to purchase, rent, or lease a variety of products used for healthcare. Some examples include hearing aids, crutches, prescription (and sometimes nonprescription) drugs, artificial limbs, and other prosthetic devices, orthodontic braces and other appliances, service dogs, oxygen supplies, and so on. These examples are merely illustrative since there are many other examples of healthcare expenses.

Different types of medical spending accounts available for these types of expenses in the United States currently include flexible spending accounts ("FSAs"), health reimbursement accounts ("HRAs"), and health savings accounts ("HSAs"), and may include other types of medical spending accounts that may be developed in the future. FSAs are financial accounts that are established as part of employer-sponsored benefits plans. Employees are able to contribute a set annual amount to the accounts, usually of part of a regular salary deduction that is applied to each paycheck. The employee is then able to spend the funds from the accounts to pay for healthcare expenses. Often the annual amount can be spent before the employee has completed making the contributions, permitting payment for healthcare expenses effectively to be made on an interest-free credit basis. Because contributions to the accounts are made as a salary reduction, they are also not subject to income tax.

HRAs are financial accounts having funds that are set aside by employers to provide reimbursement for employees who incur medical expenses. The funds can be rolled over from year to year. Because they are funded by the employer rather than the employee, the tax advantage for such accounts is enjoyed by the employers, who qualify for preferential tax treatment in a manner similar to employers who fund insurance plans.

Of particular interest are HSAs, which are financial accounts that are intended to provide for payment of unreimbursed medical expenses incurred by those who are self-employed or employed by a small organization (fewer than 50 employees). One qualification requirement for such accounts is that the employee be covered by a high-deductible insurance plan. Funds in the account can be used on a pre-income-tax basis and may earn tax-deferred interest. Like HRAs, the funds in HSAs are available to be rolled over from year to year if they are unused.

Medical spending accounts in which funds are maintained in investments have the difficulty that the value of the investments needs to be converted to cash for them to used in supported payment of healthcare expenses. There is accordingly a need in the art for improved methods and systems of using funds in medical spending accounts.

BRIEF SUMMARY OF THE INVENTION

Embodiments of the invention thus provide methods and systems of managing a medical savings account that comprises funds invested in each of a plurality of investment accounts. A request is received for payment of a healthcare expense incurred by a party authorized for recovery under the medical savings account. A balance is drawn against a line of credit secured by one or more of the investment accounts. At least a portion of the healthcare expense is paid with funds obtained from the drawn balance. At least a portion of some of the investment accounts are liquidated in accordance with instructions provided by the party or by an owner of the medical savings account to satisfy the drawn balance of the line of credit. The party authorized for recovery could be the owner of the medical savings account.

In some of these embodiments, the liquidation is an automatic liquidation: instructions provided by the party or by the owner of the medical savings account comprise predefined instructions provided prior to receiving the request. Examples of the predefined instructions could include specification of an order of the investment accounts for liquidation and/or specification of relative percentages of the investment accounts for liquidation. In other embodiments, the liquidation is a manual liquidation, with the instructions provided by the party or by the owner of the medical savings account comprising a manual specification of instructions provided after paying the healthcare expense.

The medical savings account may also sometimes comprise a cash account. A second portion of the healthcare expense may be paid with funds comprised by the cash account prior to drawing the balance against the line of credit. The cash account may thus be used to receive the balance drawn against the line of credit, permitting the at least a portion of the healthcare expense and the second portion of the healthcare expense to be paid with a single payment of the entire healthcare expense from the cash account. The cash account may also be used when liquation of the investment accounts results in liquidating an amount the exceeds the drawn balance. In such cases, an excess of the amount over the drawn balance may be deposited into the cash account.

The medical savings account may also be configured to receive contributions. In some embodiments, a received contribution is invested in at least some of the plurality of investment accounts in accordance with predefined investment instructions provided by the owner of the medical savings account. Such predefined investment instructions may also be used when liquidation of the investment accounts results in liquidating an amount that exceeds the drawn balance. An excess of the amount over the drawn balance may be reinvested in the at least some of the plurality of investment accounts in accordance with the predefined investment instructions.

Embodiments of the invention may also accommodate different mechanisms for receiving the request for payment of the healthcare expense. For example, in some embodiments, a debit transaction request is received over a network from a point of sale. The debit transaction request comprises an identification of the medical savings account and an identification of the amount for the healthcare expense. The debit transaction request might comprise an identification of a card associated with the medical savings account or might comprise an identification of a check associated with the medical savings account in different specific embodiments.

The methods of the invention may be embodied in a system having a communications device, a storage device, a processor, and a memory coupled with the processor. The memory comprises a computer-readable medium having a computer-readable program embodied therein for directing operation of the system. The computer-readable program includes instructions for operating the system in accordance with the various embodiments described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Figure 1:
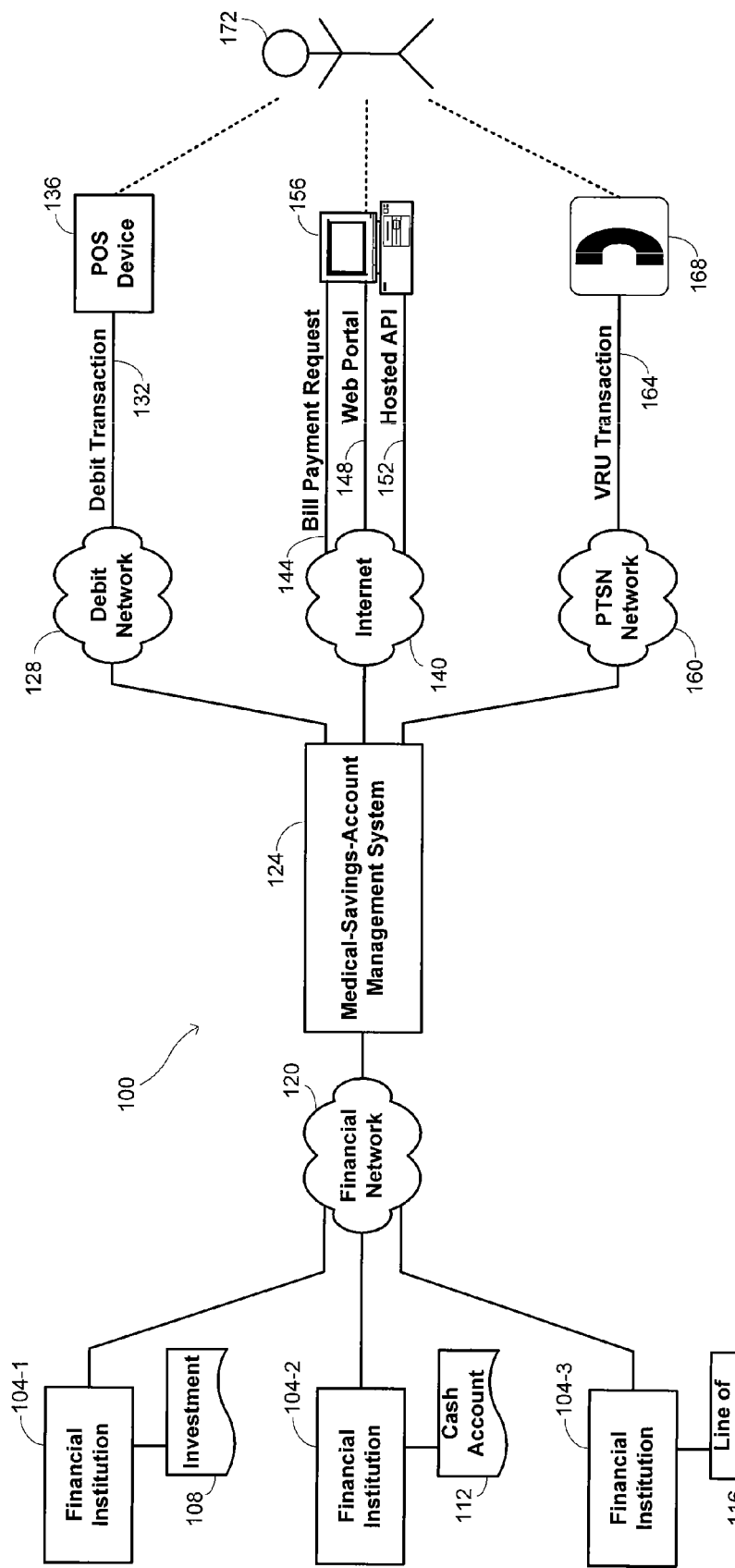
FIG. 1 is as schematic diagram illustrating an architecture within which methods of the invention may be performed.

Embodiments of the invention provide methods and systems for using funds from medical spending accounts. While certain of the description below makes reference to HSAs as they are implemented under United States law, the invention is not limited to the current structure of such accounts and may be applied more generally to any medical savings account. As used herein, a "medical savings account" refers generally to any funding vehicle that permits funds to be invested according to the direction of the account holder and that is limited by restricting distributions of funds from the account to be made for the payment of healthcare expenses. In some instances, the investment capabilities may be completely unrestricted, permitting the account holder to invest funds in any investment, including savings accounts, stocks, securities, bonds, real estate, derivatives, and so on. Different investments that may be supported by the account may have different levels of liquidity so that term instruments such as certificates of deposit may sometimes be used. In other instances, the scope of permissible investments may be restricted, with some forms of the medical savings account offering a limited menu of investment choices. In the same manner, restrictions on the type of healthcare expenses that are eligible to be paid with distributions from the medical savings accounts may differ in different embodiments. In some embodiments, any healthcare expense may legitimately be paid while other embodiments might impose a narrower schedule of healthcare expenses that are deemed to meet certain eligibility requirements.

The current implementation of HSAs in the United States are one example of medical savings accounts, but such accounts include additional restrictions that need not be imposed more generally on medical savings accounts to which embodiments of the invention apply. For example, the requirement that HSAs be used in conjunction with high-deductible health plans is not a general feature of the medical savings accounts considered herein, although it may be imposed on the accounts in specific embodiments. Similarly, HSAs may be unrestricted in certain respects where other examples of medical savings accounts have imposed limitations. One example is the lack of income limits on holders of HSAs; in embodiments that use different structures for a medical savings account, an income limit might be imposed. Similarly, while HSAs have no requirement that the account holder have "earned" income, such a requirement might be imposed in other embodiments.

There are several other characteristics of HSAs that may or may not be included in specific embodiments for implementing medical savings accounts. These include the ability for contributions to the HSAs to be made by an individual or by that person's employer; the treatment of contributions made by individuals as tax-deductible; specific limitations on contribution amounts, including age differences on contribution limits; and the like.

Embodiments of the invention provide a structure for a medical spending account that includes a cash account, a line of credit, and one or more investment accounts. Funds contributed to the medical spending account may be maintained in the cash account or in the investment accounts according to the direction of the account holder. The cash account may or may not be an interest-bearing account in different embodiments. The availability of a line of credit essentially permits funds needed for payment of an eligible healthcare expense to be made available immediately, notwithstanding the encumbrance of funds in the medical savings account being held in investment accounts. The line of credit is secured by the investments so that funds advances made according to the line of credit will generally not exceed the value of the investments. But in some specific embodiments, provision may be included to permit the advance of excess funds with the line of credit. The credit extended with the line of credit is then repaid by liquidation of the supporting investments. This may be done in different embodiments according to a predetermined schedule provided by the account holder or may be specified manually by the account holder.

An illustration of how such a scheme may be implemented in a variety of embodiments is illustrated in the drawings. FIG. 1 provides a schematic overview of an exemplary architecture 100 that may be used for implementing methods of the invention. This architecture is centered about a medical-savings-account system 124 that coordinates the exchange of information among a number of different parties as described below in implementing the functionality of the medical savings accounts. Funds identified with individual medical savings accounts are usually maintained by one or more financial institutions 104 that are equipped to exchange data with the medical-savings account system 124 through a financial network 120. Usually, the financial network 120 comprises a private network that encrypts communications and implements other security protocols to protect the sensitivity of data exchanged over it.

In many embodiments, all portions of a particular medical savings account will be administered by a single financial institution 104, but this is not a requirement of the invention. In other embodiments, including the one illustrated in FIG. 1, different portions of medical savings accounts are administered by different financial institutions 104, with the medical-savings-account management system 124 being configured to coordinate functionality among them. This permits customers who interact with the medical-savings-account management system 124 to control their respective medical savings accounts as easily as if all the parts of the accounts were managed by a single party. In the embodiment illustrated in FIG. 1, the investment accounts 108, cash account 112, and line of credit 116 for a particular medical savings account are provided by different financial institutions 104.

Interactions by customers with the medical-savings-account management system 124 may be effected in a number of different ways, some of which are shown explicitly in FIG. 1. More generally, interactions with the medical-savings-account management system 124 by a customer 172 may be provided with any interface mechanism. A particularly convenient mechanism uses a debit network 128, permitting the customer 172 to present a debit instrument as a payment instrument for a healthcare transaction. In different embodiments, the debit network 128 may comprise a public network or may comprise a private network. The debit instrument may comprise such instruments as a check, which includes identification information encoded in magnetic ink on the check. Alternatively, the debit instrument might comprise a debit card issued to the customer 172 in the form of a magnetic-stripe card having identification information encoded magnetically on a magnetic stripe, or in the form of a "smart" card having identification information encoded on a chip within the card, or may comprise some other type of card. Such uses of cards represent examples of a more general class of presentation instruments that may be used, with such devices as key fobs, near-field communication-enabled wireless telephones, and the like alternatively being used in some embodiments as surrogates for the debit instrument.

To initiate a debit transaction 132 supporting the purchase of healthcare goods or services, the customer 172 presents the debit instrument so that it can be swiped or otherwise provided to a point-of-sale device 136, which extracts the identification information from the debit instrument. This information may be routed to the medical-savings-account management system 124, which may then apply the administration rules described below in processing the debit transaction request to approve payment for the healthcare goods or services.

Other techniques for transmitting a request to the medical-savings-account management system 124 include transmission effected over a public network like the Internet 140. Because of the public nature of such a network 140, it is preferable that the data be secured during transmissions with the medical-savings-account management system 124. To initiate the request using such a mechanism, the customer 172 may interact with a computational device 140 in any of a number of different ways. The drawing provides as examples the generation of a bill-payment request 144, the use of a web portal 148, and the use of a hosted application programming interface ("API") 152. Any of these different mechanisms may be used to generate a request that is transmitted over the Internet 140 for accessing a medical savings account to support a purchase of eligible healthcare goods or services.

Still another technique for generating a request to the medical-savings-account management system 124 uses the public switched telephone network ("PSTN") 160 in combination with voice-recognition-unit ("VRU") equipment to permit the customer 172 to generate the request over a telephone 168. The request is then generated as a VRU transaction 164.

Figure 2:
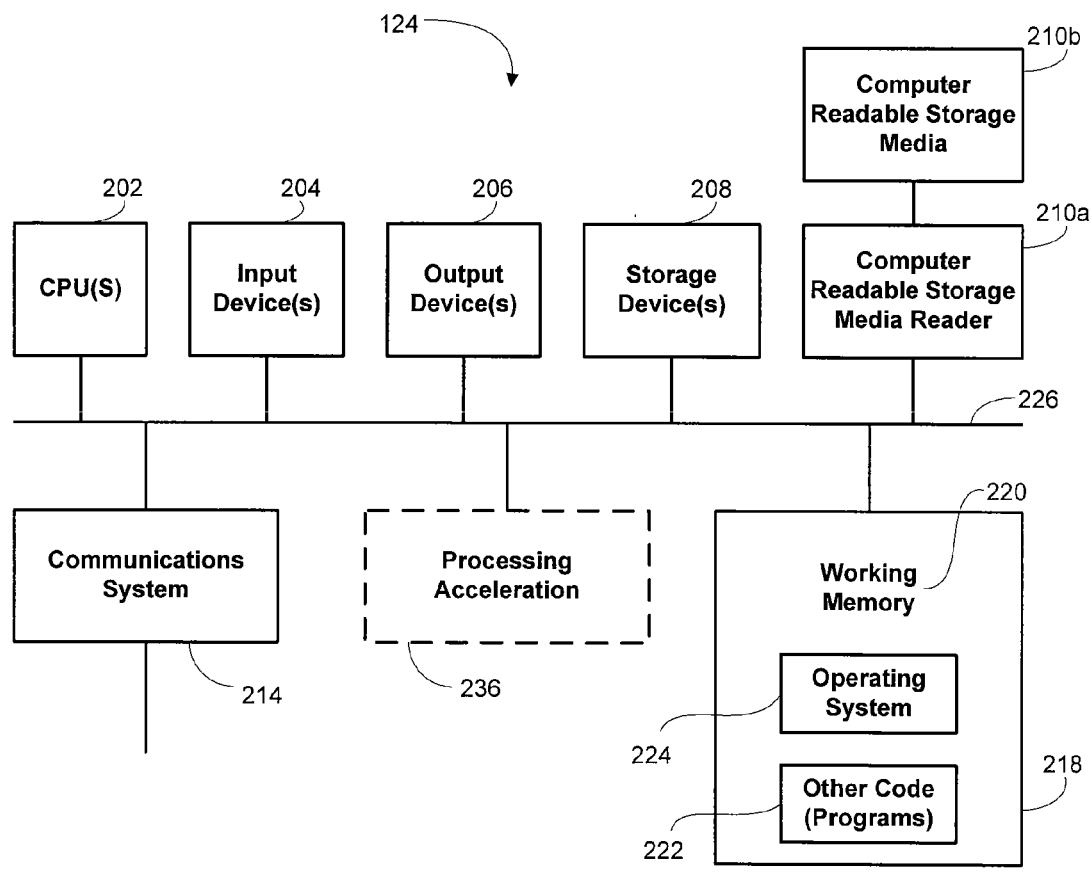
FIG. 2 is a schematic diagram of a computational device on which methods of the invention may be embodied.

FIG. 2 provides a schematic illustration of a physical structure that may be comprised by the medical-savings-account management system 124 to implement embodiments of the invention. FIG. 2 broadly illustrates how individual system elements may be implemented in a separated or more integrated manner. The medical-savings-account management system 124 is shown comprised of hardware elements that are electrically coupled via bus 226, including a processor 202, an input device 204, an output device 206, a storage device 208, a computer-readable storage media reader 210a, a communications system 214, a processing acceleration unit 216 such as a DSP or special-purpose processor, and a memory 218. The computer-readable storage media reader 210a is further connected to a computer-readable storage medium 210b, the combination comprehensively representing remote, local, fixed, and/or removable storage devices plus storage media for temporarily and/or more permanently containing computer-readable information. The communications system 214 may comprise a wired, wireless, modem, and/or other type of interfacing connection and permits data to be exchanged over the architecture described in connection with FIG. 1.

The medical-savings-account management system 124 also comprises software elements, shown as being currently located within working memory 220, including an operating system 224 and other code 222, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Figure 3:
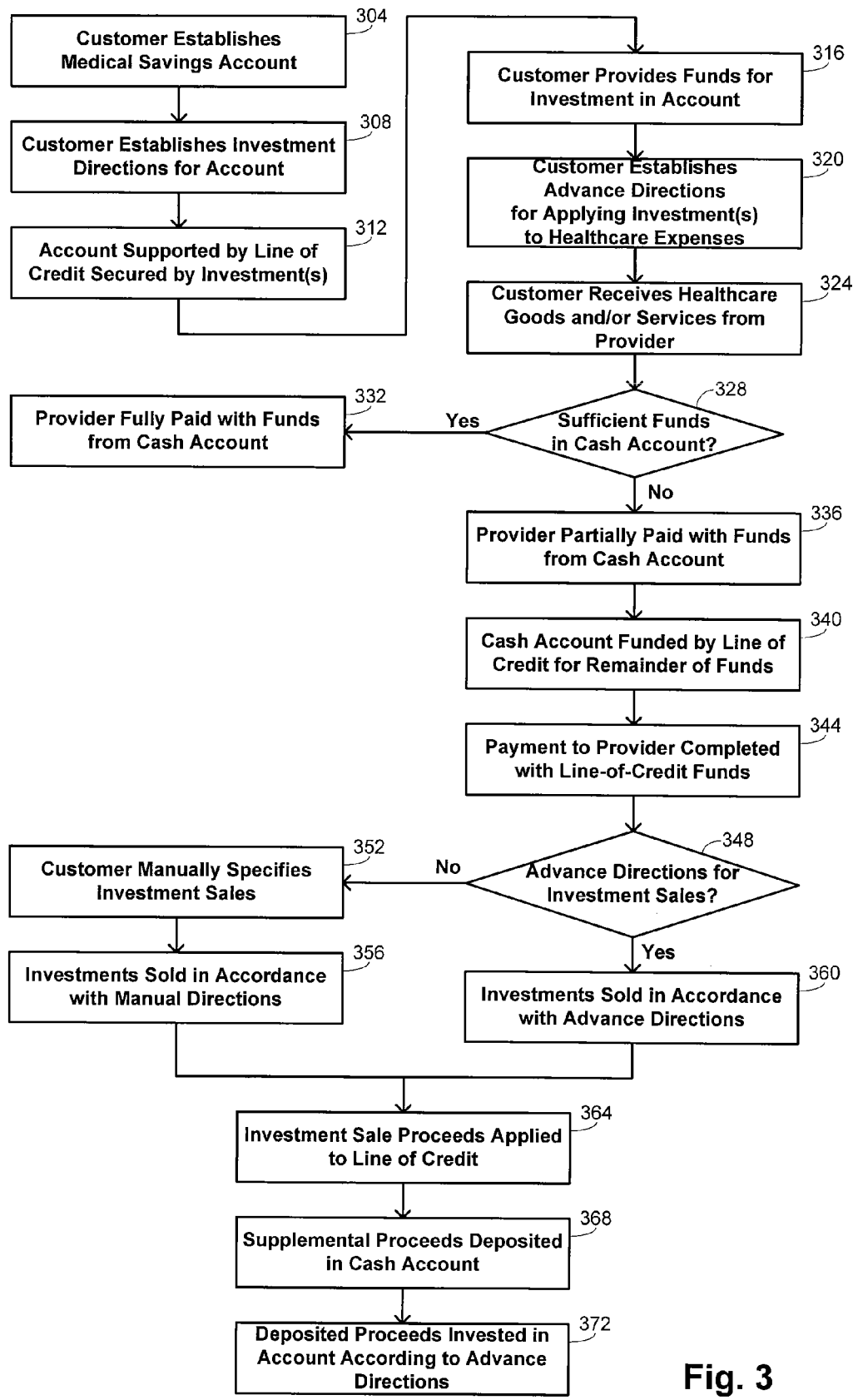
FIG. 3 is a flow diagram that summarizes methods of funding medical spending accounts in accordance with embodiments of the invention.

Methods by which funds may be provided to support a healthcare transaction using a medical savings account having features like those described herein are summarized for a number of different embodiments with the flow diagram of FIG. 3. While this flow diagram sets forth a number of specific functions that may be performed, it should be realized that the diagram is not exhaustive in showing every function that may be performed, nor is it limited in showing only functions that must be performed. In various alternative embodiments, some of the functions may be omitted, additional functions may be added, or the order of the functions may be changed.

Figure 4:
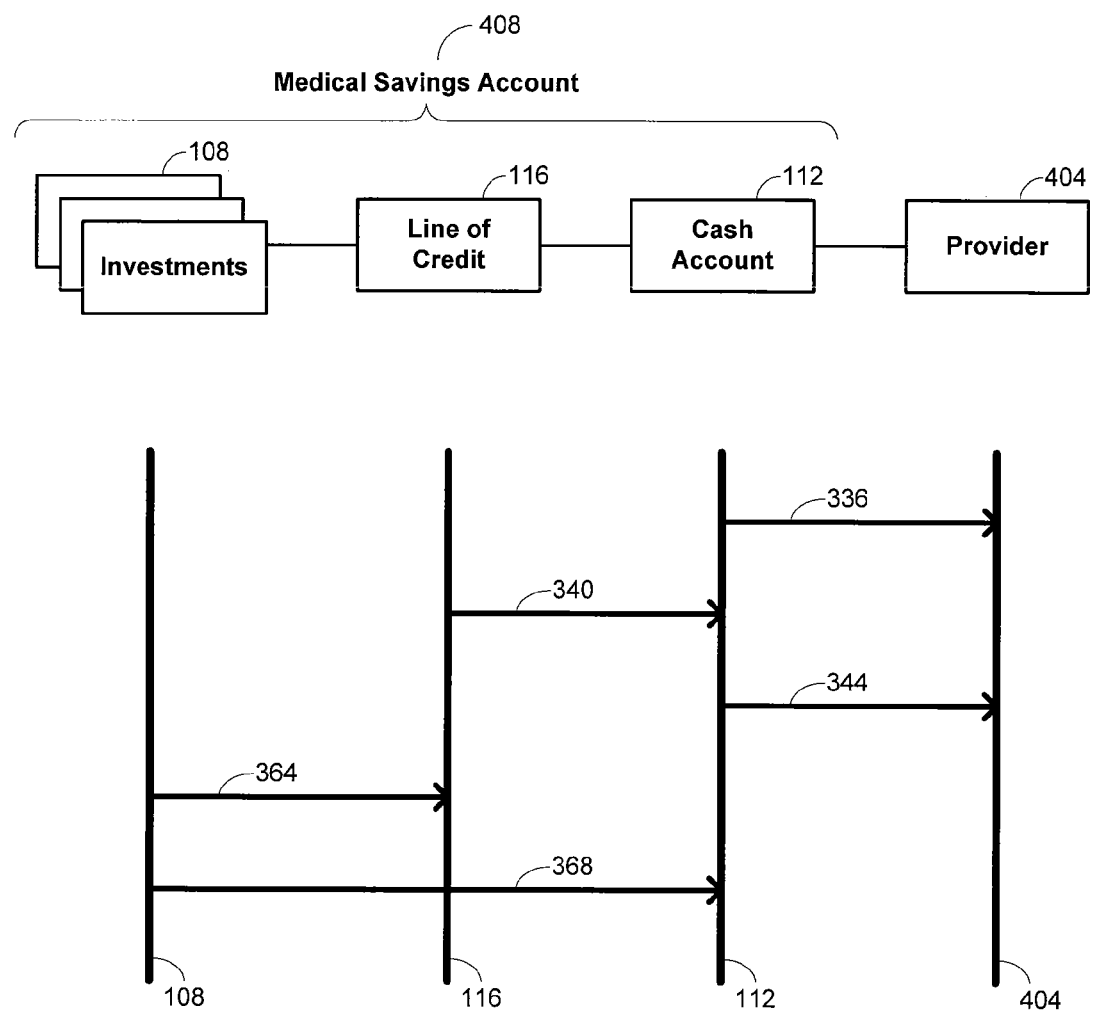
FIG. 4 is a schematic diagram that illustrates flows of funds when implementing the methods of FIG. 3.

The methods begin at block 304 with the customer 172 establishing a medical savings account. FIG. 4 provides a schematic illustration of the structure of the medical savings account 408, which includes mechanisms for maintaining investments 108, for supplying a line of credit 116, and a cash account 112. FIG. 4 shows how certain of the functions that may be performed in connection with FIG. 3 may result in a flow of funds among different parts of the medical savings account 408 and to a provider of healthcare goods or services. This is done graphically with vertical bars representing the different components of the medical savings account 408 and provider, with horizontal arrows showing the flow.

Returning to FIG. 3, the customer 172 may be provided with an opportunity to establish investment directions for funds deposited into the medical savings account 408 at block 308. These directions essentially dictate how funds that are received are to be apportioned into different investment accounts 108. Usually, such direction takes the form of providing percentages for each of several accounts, with each deposit into the medical savings account 408 being divided according to those percentages for investment in the specific investment accounts 108, but other techniques may alternatively be used. As previously noted, the investment accounts 108 that are available may vary depending on the structure of the medical savings account 408, with some structures permitting funds to be routed to any investment and other structures limiting the investment options. The investment directions may include directing a portion of the funds supplied to the cash account 112. In instances where the customer 172 does not provide directions at block 308, a default apportionment may be implemented, often simply directing all of the funds received to the cash account 112.

Block 312 indicates that a line of credit 116 is supplied to support the medical savings account 408 and is secured by the investment accounts 108. The level of credit available may thus be tied with the total value of the investment accounts 108. In some instances, the line of credit accordingly fluctuates with the total investment-account value so that it is not possible to obtain more funds with the line of credit than are invested in the investment accounts at any given time. While the size of the line of credit may be exactly equal to the total value of the investment accounts 108, in other instances, it is some fraction of that total value to represent the possibility of the value decreasing while other parts of the method are implemented.

Block 316 of the drawing indicates that the customer 172 provides the funds, which are invested according to the directions provided at block 308 in the investment accounts. Often, the funds are provided on a periodic basis, such as when they are provided as part of a regular payroll deduction, but they may be provided on a nonperiodic basis also.

The customer 172 is provided with the ability to specify advance directions for applying investment funds for the payment of healthcare expenses. Essentially, such advance directions dictate an order and/or percentage application of individual investments to be made in paying eligible healthcare expenses. There are a variety of ways in which such instructions may be provided, some of which are illustrated specifically below.

The goal of subsequent functions is to give effect to those advance directions when the customer receives eligible healthcare goods and/or services from the provider 404 at block 324, notwithstanding the fact that the funds are tied up in different investments that may have different levels of liquidity. A default may be to apply funds from the cash account 112 to the transaction before accessing any investment funds. Such a default may be implemented by checking at block 328 whether there are sufficient funds in the cash account 112 to support the entire transaction. If so, the provider 404 is fully paid with those funds at block 332. If funding of the cash account 112 is insufficient, a partial payment may be made to the provider at block 336 using the funds that are available in the cash account. This is indicated with an arrow 336 in FIG. 4 to show a transfer of funds from the cash account 112 to the provider 404.

The remainder of the transaction with the provider 404 is funded by the line of credit 116. This may take place by transferring funds supplied by the line of credit 116 into the cash account 112 as indicated at block 340 of FIG. 3 and arrow 340 of FIG. 4. Payment to the provider 404 is then completed with the funds obtained from the line of credit 116 as indicated at block 344 of FIG. 3 and arrow 344 of FIG. 4. Such a mechanism may be advantageous when the cash account 112 is maintained at a different financial institution 104 than the line of credit 116 by providing a convenient mechanism for all funds transmitted to the provider 404 to be routed through the cash account 112 as a common account. For instance, the functions of blocks 336, 340, and 344 may advantageously be performed substantially simultaneously so that funds provided at blocks 336 and 344 are provided as a single payment to the provider 404. This allows the transaction with the provider 404 to be effected as a single transaction that transmits the entire amount due for the healthcare goods or services to the provider 404 rather than dividing the transaction amount into a plurality of payments.

From the perspective of the customer 172 and provider 404, the transaction may thus proceed efficiently by the customer 172 providing a transaction instrument to the provider 404 upon receipt of the healthcare goods or services. The provider 404 extracts information from the transaction instrument by using a point-of-sale device 136, by generating a bill-payment request, or by any of the other mechanisms discussed in connection with FIG. 1. The transaction request is transmitted in much the same fashion as any conventional credit or debit transaction, and a response is received confirming a transfer of the entire amount due to consummate the transaction.

After providing payment to provider 404, the medical-savings-account management system 104 may implement the advance directions for accessing funds from the investment accounts 108 to satisfy the funds drawn against the line of credit 116. This may be accomplished by performing a check at block 348 whether any advance directions have been specified. If so, the investments are sold in accordance with those directions, such as by liquidating investment assets in a prescribed order and/or by liquidating specified portions of the investments.

If no advance directions have been specified, the customer 172 may be provided with an opportunity to provide a manual specification of investment sales at block 352. This may be implemented by providing an interface for the customer 172 to access a list of the investments available to apply, perhaps with additional information such as a current value of each investment, its historical performance, and the like. The interface could include a mechanism for the customer 172 to provide the manual specification by indicating the amount to be applied from each investment. The investments are accordingly sold at block 356 as specified.

Irrespective of how the investment sales are determined, proceeds from those sales is applied to the line of credit at block 364, with the corresponding flow of funds being indicated by the corresponding arrow in FIG. 4. In some instances, the investment sales may result in an excess of funds beyond that needed to satisfy the balance due on the line of credit 116. For instance, this might result from the manner in which the advance or manual directions for selling the investments was structured, or for other reasons. In cases where this is an excess, supplemental proceeds from the investment sales may be deposited in the cash account 112 as indicated at block 368 of FIG. 3 and with arrow 368 of FIG. 4. In some instances, these proceeds may subsequently be reinvested at block 372 with the investment directions established for the medical savings account 408 at block 308 in the same manner as any other deposit of funds.

Figure 5A:
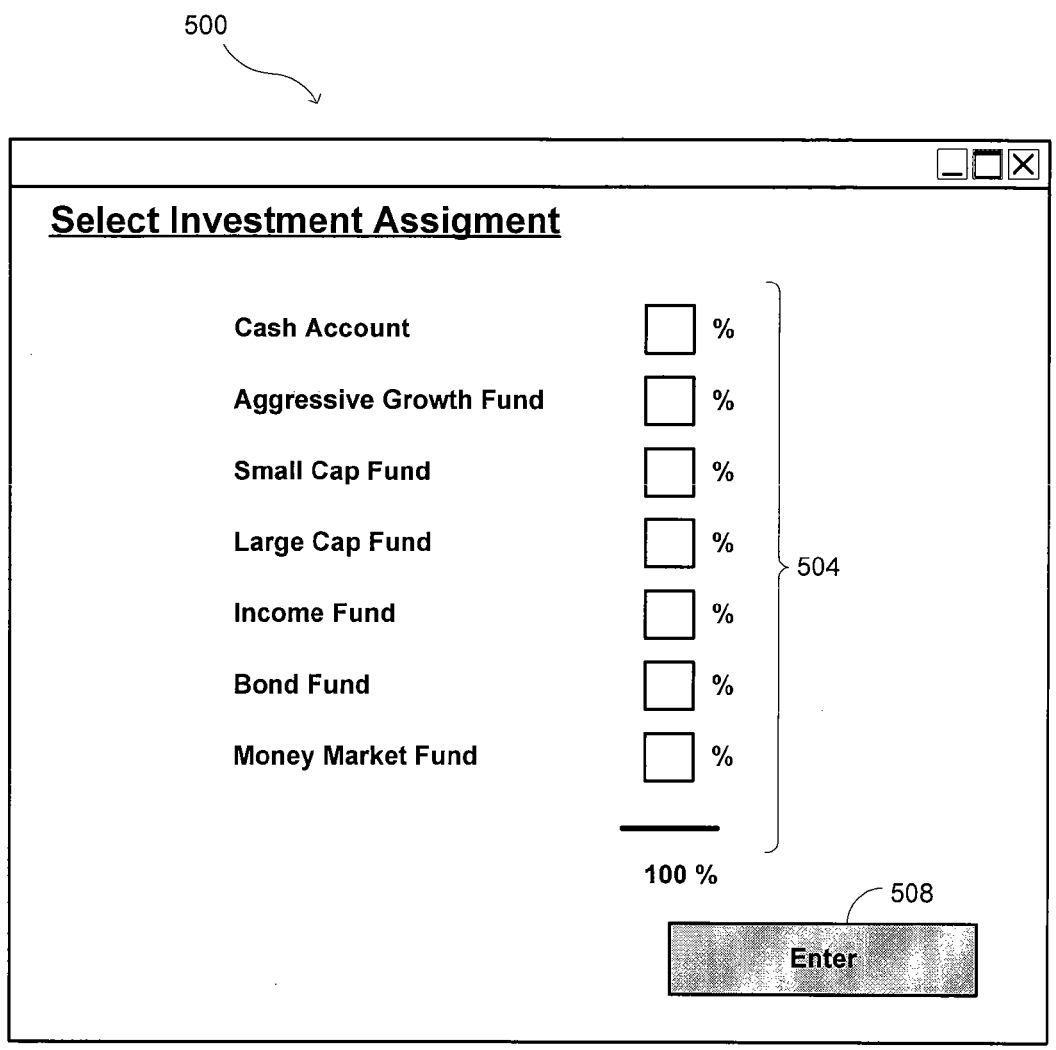
FIGS. 5A and 5B are examples of screens that may be presented to a user of an interface in implementing the methods of FIG. 3.
Figure 5B:
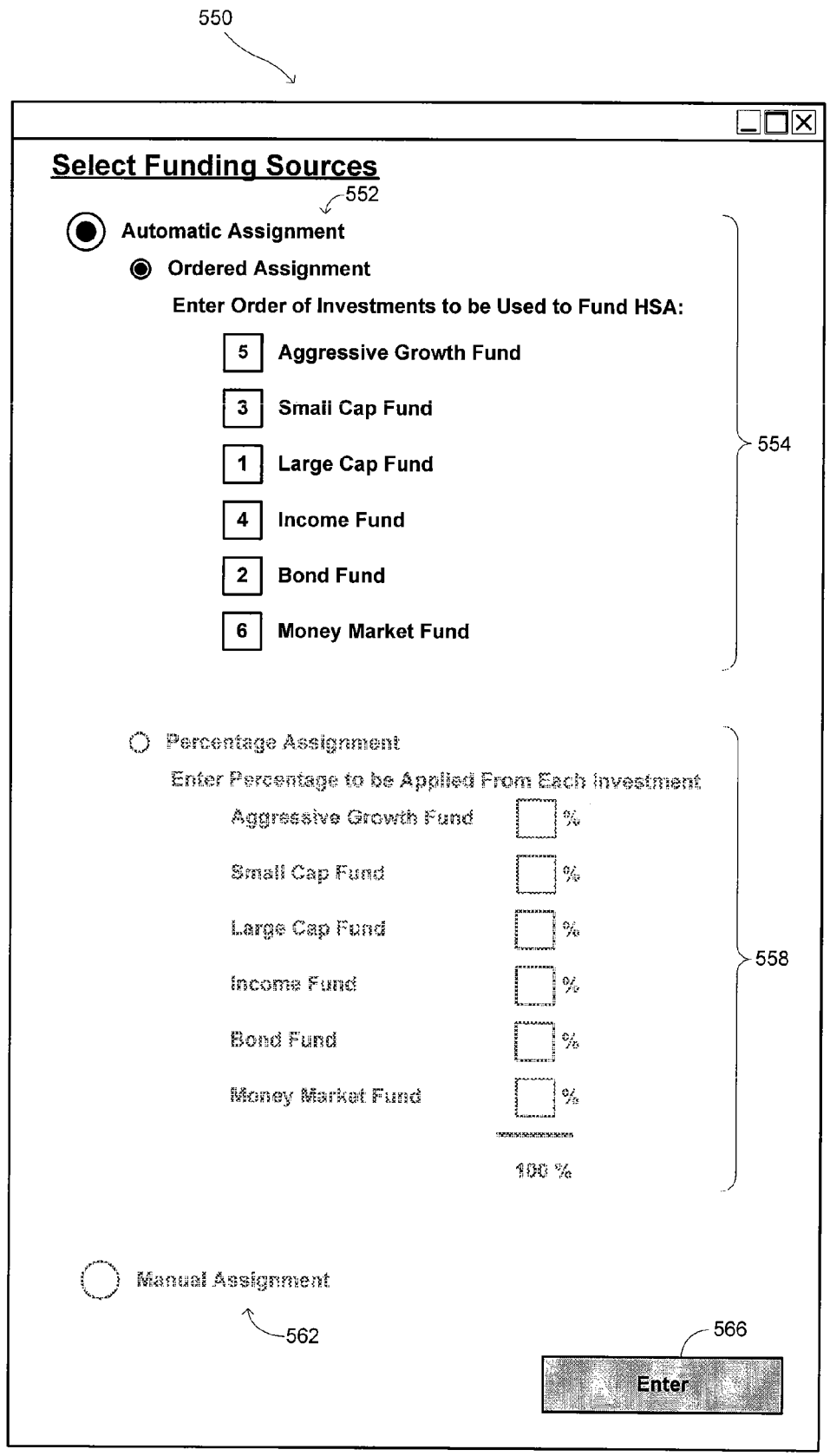

Examples of the kinds of interfaces that may be provided to customers 172 in managing their medical savings accounts and, in particular, for defining investment directions and liquidation directions, are provided with the illustrative screen shots of FIGS. 5A and 5B. These interfaces may typically be accessed by using a web interface to the Internet 140 over a computational device, with the medical-savings-account management system 124 generating the displays and receiving input provided by the customers 172.

For instance, FIG. 5A presents a screen interface 500 that may be used by a customer 172 at block 308 of FIG. 3 in establishing investment directions for the account. A percentage may be specified for each of a different set of investments 504, including the cash account, with the total assignment constrained to total 100%. When an assignment has been specified, an enter 508 button may be activated so that the investment directions for the account are recorded by the medical-savings-account management system 124. When funds are provided to the account for investment at block 316, they are then invested in accordance with the specified directions.

FIG. 5B presents a screen interface 550 that may be used by the customer 172 in specifying the advance directions for investment liquidations at block 320 of FIG. 3. In this particular illustration, options are provided for either automatic 552 or manual 562 assignment of directions, with automatic assignment 552 also providing options for an ordered assignment 554 or a percentage assignment 558, although different kinds of options may be provided in alternative embodiments. A radio-button interface limits the customer 172 to selecting either the automatic assignment 552 or the manual assignment 562 in this illustration, although other embodiments might provide an ability for a portion of the directions to be made automatically and for a portion to be made manually. Selection of an automatic assignment 552 results in investments being sold in accordance with those directions at block 360, while selection of a manual assignment 562 results in the customer 172 being provided with a subsequent opportunity to specify how the liquidation is to proceed at block 352.

The ordered assignment 554 operates by completely liquidating investment assets in an order prescribed by the interface, which thus includes fields for the customer to specify the liquidation order. The percentage assignment 558 operates by liquidating investments in accordance with defined percentages, and thus includes fields for the customer to specify those percentages, subject to the constraint that the percentages add to 100%. In this example, a radio-button interface requires the customer 172 to select either an ordered assignment or a percentage assignment, although other embodiments may permit hybrid approaches. For example, fields could be provided to allow the customer 172 to specify that some fraction of a first investment be sold, followed by some fraction of a second investment, and so on. There are numerous options that may be permitted in different embodiments to enable the liquidation to proceed as directed by the customer 172.

Once the customer has selected the desired liquidation orders, the instructions are confirmed by activating an enter button 566, causing the medical-savings-account management system 124 to record the selections and then apply them at blocks 348-360 of FIG. 3 as appropriate.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method of managing a medical savings account, the medical savings account comprising funds invested in each of a plurality of investment accounts, the method comprising:
   receiving with a computer system a request for payment of a healthcare expense incurred by a party authorized for recovery under the medical savings account;
   Initiating by the computer drawing a balance against a line of credit secured by one or more of the investment accounts;
   Initiating by the computer paying at least a portion of the healthcare expense with funds obtained from the drawn balance;
   Initiating by the computer liquidating at least a portion of some of the investment accounts in accordance with instructions provided by the party or by an owner of the medical savings account to satisfy the drawn balance of the line of credit, wherein liquidating the at least a portion of some of the investment accounts comprises liquidating an amount that exceeds the drawn balance; and
   initiating, with the computer system, investment of an excess of the amount over the drawn balance in accordance with predefined investment instructions.

2. The method recited in claim 1 wherein the instructions provided by the party or by the owner of the medical savings account comprise predefined instructions provided prior to receiving the request, whereby liquidating the at least a portion of some of the investment accounts comprises an automatic liquidation.

3. The method recited in claim 2 wherein the predefined instructions specify an order of the investment accounts for liquidation.

4. The method recited in claim 2 wherein the predefined instructions specify relative percentages of the investment accounts for liquidation.

5. The method recited in claim 1 wherein the instructions provided by the party or by the owner of the medical savings account comprise a manual specification of instructions provided by the party or by the owner of the medical savings account after paying the healthcare expense.

6. The method recited in claim 1 wherein the medical savings account further comprises a cash account, the method further comprising paying a second portion of the healthcare expense with funds comprised by the cash account prior to drawing the balance against the line of credit.

7. The method recited in claim 6 wherein: drawing the balance against the line of credit comprises depositing the drawn balance into the cash account; and paying the at least a portion of the healthcare expense and paying the second portion of the healthcare expense comprises making a single payment of the entire healthcare expense from the cash account.

8. The method recited in claim 6 wherein liquidating the at least a portion of some of the investment accounts comprises liquidating an amount that exceeds the drawn balance, the method further comprising depositing an excess of the amount over the drawn balance into the cash account.

9. The method recited in claim 1 wherein receiving the request for payment of the healthcare expense comprises receiving a debit transaction request over a network from a point of sale, the debit transaction request comprising an identification of the medical savings account and an identification of an amount for the healthcare expense.

10. The method recited in claim 9 wherein the debit transaction request further comprises an identification of a card associated with the medical savings account.

11. The method recited in claim 9 wherein the debit transaction request further comprises an identification of a check associated with the medical savings account.

12. The method recited in claim 1 wherein the party is the owner of the medical savings account.

13. A system for managing a medical savings account, the medical savings account comprising funds invested in each of a plurality of investment accounts, the system comprising:

a communications system;

a storage device;

a processor in communication with the communications system and with the storage device; and a memory coupled with the processor, the memory comprising a computer-readable medium having a computer-readable program embodied therein for directing operation of the system, the computer-readable program including:

instructions for receiving a request with the communications system, the request comprising a request for payment of a healthcare expense incurred by a party authorized for recovery under the medical savings account;

instructions for drawing a balance against a line of credit secured by one or more of the investment accounts by transmitting a line-of-credit instruction using the communications system to a financial institution administering the line of credit;

instructions for paying the healthcare expense with funds obtained from the drawn balance;

instructions for liquidating at least a portion of some of the investment accounts in accordance with instructions provided by the party or by an owner of the medical savings account to satisfy the drawn balance of the line of credit by transmitting a liquidation instruction using the communications system to a financial institution administering the some of the investment accounts, the instructions for liquidating at least a portion of some of the investment accounts comprising instructions for liquidating an amount that exceeds the drawn balance;

instructions for initiating investment of an excess of the amount over the drawn balance in accordance with predefined investment instructions.

14. The system recited in claim 13 wherein the instructions provided by the party or by the owner of the medical savings account comprise predefined instructions provided prior to executing the instructions for receiving the request, whereby liquidating the at least a portion of some of the investment accounts comprises an automatic liquidation.

15. The system recited in claim 14 wherein the predefined instructions specify an order of the investment accounts for liquidation.

16. The system recited in claim 14 wherein the predefined instructions specify relative percentages of the investment accounts for liquidation.

17. The system recited in claim 13 wherein the instructions provided by the party or by the owner of the medical savings account comprise a manual specification of instructions provided by the party or by the owner of the medical savings account after executing the instructions for paying the healthcare expense.

18. The system recited in claim 13 wherein:

the medical savings account further comprises a cash account; and the computer-readable program further comprises instructions for paying a second portion of the healthcare expense with funds comprised by the cash account prior to drawing the balance against the line of credit.

19. The system recited in claim 18 wherein:

the instructions for drawing the balance against the line of credit comprise instructions for depositing the drawn balance into the cash account; and the instructions for paying the at least a portion of the healthcare expense and the instructions for paying the second portion of the healthcare expense comprise instructions to make a single payment of the entire healthcare expense from the cash account.

20. The system recited in claim 18 wherein:

the instructions for liquidating at least a portion of some of the investment accounts comprise instructions for liquidating an amount that exceeds the drawn balance; and the computer-readable program further includes instructions for depositing an excess of the amount over the drawn balance into the cash account.

21. The system recited in claim 13 wherein the computer-readable program further includes:

instructions for receiving a contribution to the medical savings account; and instructions for investing the contribution in at least some of the plurality of investment accounts in accordance with the predefined investment instructions provided by the owner of the medical savings account.

22. The system recited in claim 13 wherein the instructions for receiving the request comprise instructions for receiving a debit transaction request over a network from a point of sale, the debit transaction request comprising an identification of the medical savings account and an identification of an amount of the healthcare expense.

23. The system recited in claim 22 wherein the debit transaction request further comprises an identification of a card associated with the medical savings account.

* * * * *